United States Patent
Phillips et al.

(10) Patent No.: US 7,415,460 B1
(45) Date of Patent: Aug. 19, 2008

(54) SYSTEM AND METHOD TO CUSTOMIZE SEARCH ENGINE RESULTS BY PICKING DOCUMENTS

(75) Inventors: Anthony H. Phillips, Southampton (GB); Edward J. Slattery, Wichester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/953,425

(22) Filed: Dec. 10, 2007

(51) Int. Cl.
*G06F 17/30* (2006.01)
(52) U.S. Cl. ................................. 707/3; 707/5; 707/10
(58) Field of Classification Search .................... 707/3, 707/4, 5, 6, 10, 101
See application file for complete search history.

(56) References Cited

U.S. PATENT DOCUMENTS

| | | | |
|---|---|---|---|
| 5,241,671 A | 8/1993 | Reed et al. | |
| 5,694,593 A | 12/1997 | Baclawski | |
| 5,734,893 A | 3/1998 | Li et al. | |
| 5,877,766 A | 3/1999 | Bates et al. | |
| 6,014,664 A | 1/2000 | Fagin et al. | |
| 6,041,323 A | 3/2000 | Kubota | |
| 6,169,986 B1 | 1/2001 | Bowman et al. | |
| 6,233,575 B1 | 5/2001 | Agrawal et al. | |
| 6,256,648 B1 | 7/2001 | Hill et al. | |
| 6,434,556 B1 | 8/2002 | Levin et al. | |
| 6,519,648 B1 * | 2/2003 | Eyal ........................... | 709/231 |
| 6,725,275 B2 * | 4/2004 | Eyal ........................... | 709/231 |
| 6,763,362 B2 * | 7/2004 | McKeeth .................. | 707/104.1 |
| 6,772,150 B1 | 8/2004 | Whitman et al. | |
| 6,785,671 B1 | 8/2004 | Bailey et al. | |
| 6,823,333 B2 | 11/2004 | McGreevy | |
| 6,963,867 B2 | 11/2005 | Ford et al. | |
| 6,980,984 B1 | 12/2005 | Huffman et al. | |
| 7,010,537 B2 * | 3/2006 | Eyal et al. .................... | 707/100 |
| 7,089,236 B1 | 8/2006 | Stibel | |
| 7,165,119 B2 | 1/2007 | Fish | |
| 7,240,049 B2 * | 7/2007 | Kapur .......................... | 707/3 |
| 7,343,374 B2 * | 3/2008 | Berkhin ........................ | 707/5 |
| 2002/0194166 A1 | 12/2002 | Fowler et al. | |
| 2003/0217056 A1 | 11/2003 | Allen et al. | |
| 2005/0010605 A1 | 1/2005 | Conrad et al. | |
| 2005/0165745 A1 | 7/2005 | Hagale et al. | |
| 2005/0171946 A1 | 8/2005 | Maim | |

(Continued)

FOREIGN PATENT DOCUMENTS

EP  1 647 903 A1  4/2006

OTHER PUBLICATIONS

Go Big West, "Customizing search engine Results", Aug. 15, 2005, pp. 1-8.*

(Continued)

*Primary Examiner*—Jean M Corrielus
(74) *Attorney, Agent, or Firm*—Scully, Scott, Murphy & Presser, P.C.; Scott Roberts

(57) ABSTRACT

A method to generate best matching search keywords is disclosed. After running an Internet search engine, a user selects links. From the links, common keywords are extracted and sorted based on the number of times that the common keywords appears in the contents of the links. The search engine runs searches based on a few of top ranked keywords, generates best matching search keywords, and provides the selected links as well as more links that relates to the best matching search keywords.

2 Claims, 3 Drawing Sheets

U.S. PATENT DOCUMENTS

2006/0122983 A1   6/2006   King et al.

OTHER PUBLICATIONS

Chen, L., "WebMate: A Personal Agent for Browsing and Searching", Proceedings of the 2nd International Conference on Autonomous Agents, Sep. 30, 1997, pp. 1-16.

Chen H. et al.; "Online Query Refinement on Information Retrieval Systems: A Process Model of Searcher/System Interactions", Proceedings of the 13th Annual International ACM SIGIR Conference, 1989, pp. 115-133.

Efthimiadis, E.N. et al., "Query Expansion", pp. 1-42, (Appeared in: Williams, M. ed. Annual Review of Information Systems and Technology (ARTIST), vol. 31, 1996, pp. 121-187).

Klein, M., "Searching for Service on the Semantic Web Using Process Ontologies", The First Semantic Web Working Symposium, 2001, pp. 1-16.

Long, X., "Three-Level Caching for Efficient Query Processing in Large Web Search Engines", Journal of the World Wide Web, vol. 9, No. 4, pp. 257-266, 2005.

Raghavan H., "Active Learning with Feedback on Both Features and Instances", Journal of Machine Learning Research, vol. 7, 2006, pp. 1655-1686.

Weiss R., "HyPursuit: A Hierarchical Network Search Engine that Exploits Content-Link Hypertext Clustering", Conference on Hypertext and Hypermedia, Proceedings of the Seventh ACM Conference on Hypertext, 1996, pp. 180-193.

White, R., "A Study of Real-Time Query Expansion Effectiveness", SIGIR'06, Aug. 6-11, 2006, pp. 1-2.

Widyantoro, D., "A Fuzzy Ontology-based Abstract Search Engine and Its User Studies", The Tenth IEEE International, vol. 3, 2001, pp. 1291-1294.

Atanasova, T., "An Approach for Intelligent Decision Support in Research Knowledge Network", Institute of Information Technologies, vol. 52, 2001, pp. 35-42.

* cited by examiner

```
                    WEB    IMAGES  GROUPS  NEWS  FROOGLE  MORE >>
  Google™         ┌─────────────────────────────────────────┐  ┌────────┐   ADVANCED
                  │ tennis                                  │  │ SEARCH │   SEARCH
                  └─────────────────────────────────────────┘  └────────┘   PREFERENCES
                    SEARCH: ⦿ THE WEB ○ PAGES FROM THE UK
```

WEB
                                                    ┌─106              ┌─102
RESULTS RETURNED NO LOWER THAN PAGE:    │   5   │   (FIND MATCHING SEARCH)

BBC SPORT | TENNIS ☑─104
NEWS, RESULTS, SCHEDULE, FEATURES AND ANALYSIS FROM BBC SPORTS.
news.bbc.co.uk/sport1/hi/tennis/default.stm - 48k - 18 Dec 2006 - Cached - Similar pages THE ALL ENGLAND LAWN TENNIS CLUB ☐
THE OFFICIAL WEB SITE OF THE ALL ENGLAND LAWN TENNIS AND CROQUET CLUB AND THE WIMBLEDON
CHAMPIONSHIPS.
www.wimbledon.org/ - 2k - Cached - Similar pages WIMBLEDON - THE OFFICIAL WEB SITE OF THE ALL ENGLAND LAWN TENNIS ... ☐
    details of how to purchase a ticket at the turnstiles on the day of play and other relevant
    information, 2007 Ticket information, Latest Tennis News
    www.wimbledon.org/en_GB/index.html - 22k - 18 Dec 2006 - Cached - Similar pages ITF TENNIS - HOME PAGE ☐
THE WEB SITE OF THE INTERNATIONAL TENNIS FEDERATION, THE WORLD GOVERNING BODY OF TENNIS -
INFORMATION ON ALL ASPECTS OF TENNIS INCLUDING PLAYERS, RECORDS, ...
www.itftennis.com/ - 21k - 18 Dec 2006 - Cached - Similar pages LTA TENNIS NATION LTA HOME ☑
THE GOVERNING BODY FOR THE GAME OF TENNIS IN GREAT BRITAIN, NEWS, TOURNAMENTS, RANKINGS,
MEMBER CLUBS DIRECTORY, MEMBERSHIP INFORMATION, AND COACHING ...
www.lta.org.uk/ - 57k - Cached - Similar pages TENNIS.com - THE OFFICIAL SITE OF TENNIS MAGAZINE ☑
OFFERS TENNIS NEWS FROM TENNIS MAGAZINE. INCLUDES PROFESSIONAL AND COLLEGE UPDATES,
INSTRUCTION, GEAR, AND LINKS.
www.tennis.com/ - 42k - 18 Dec 2006 - Cached - Similar pages

FIG. 1

SYSTEM AND METHOD TO CUSTOMIZE SEARCH ENGINE RESULTS BY PICKING DOCUMENTS

BACKGROUND OF THE INVENTION

1. Fields of the Invention

The present invention relates to keyword searching. More particularly, the present invention relates to customizing search engine results.

2. Description of the Prior Art

Search engines have become the dominant way to access information on the Internet, providing ease of use and accurate results. Typically, search results generated from a search engine comprise a list of URLs (Uniform Resource Locator) of web sites. However, there are many occasions when the web sites that a user is interested in are scattered throughout the results. Often the results of interest do not appear on the first page but in subsequent result pages. This behavior may disappoint a user, if the user wishes to distribute the search results to other users (or perhaps store the search query string in a document). The Google™ Similar Pages feature serves only to find similar documents and does not provide accurate documents.

For example, when a user clicks on the "Similar Pages" link for a search result Google™ automatically bring web pages that are related to this result. The Similar Pages feature can be used for many purposes. If a user likes a particular site's content, but wish it had more, Similar Pages can find sites with similar content with which the user may be unfamiliar. If a user is looking for product information, Similar Pages can find competitive information so the user can make direct comparisons. If a user is interested in researching a particular field, Similar Pages can help the user find a large number of resources very quickly, without having to worry about selecting the right keywords.

However, the more specialized a page is, the fewer results the existing search engines can find for a user. For example, the Similar Pages feature of Google™ may not be able to find related pages for a personal home page, if it does not have enough information to associate other pages with it. Also, if companies use multiple URLs for their pages (such as company.com and www.company.com), Similar Pages may have little information on one URL, but lots on the other.

Therefore, it would be desirable to have a search engine and a method for providing more accurate search result documents.

SUMMARY OF THE INVENTION

The present invention describes an additional feature to current existing search engines such as Yahoo®, Google®, etc.

A user selects documents (web pages, PDFs, or any other documents returned) in search results generated from a search engine and enters a position, which specifies how high the selected documents shall appear on search results. In one embodiment, default values may be used for the position. The search engine extracts keywords from the selected documents, and produce overall ranking of extracted keywords by performing content analysis. The search engine runs search and generates search results based on one or more of top ranked keywords. If the search results do not include the selected documents within the entered position in the search results, the search engine runs search using more of top ranked keywords. If the selected documents are returned within entered position in search results, the keywords that used to generate the search results are returned as a best matching search keyword to the user. Then, the user can obtain the best matching search keyword that generates the selected documents as search results as well as other documents related to the best matching search keyword.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explain the principles of the invention. In the drawings, FIG. 1 depicts an embodiment of the present invention.

DETAILED DESCRIPTION

Figure 2:
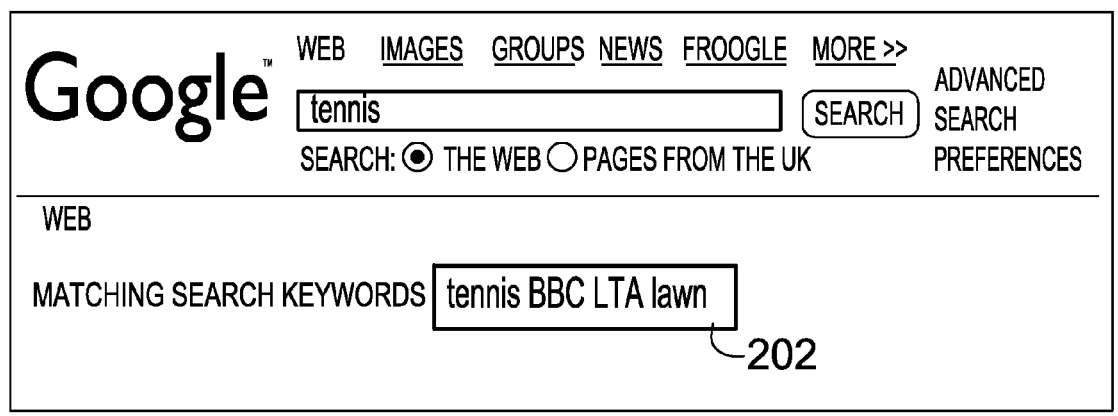
FIG. 2 depicts a generated result after performing the content analysis in accordance with the present invention.

When a normal query is run through a search engine, a user enters some keywords and then the user obtains a list of documents (web pages, PDFs, etc.) as search results. The result is listed in the order that the search engine believes best match with the keywords entered. However a user may want to generate a set of keywords such that a specific set of documents are returned. Then according to the present invention, a search engine takes a set of documents and generates the keywords from the set of documents such that entering the keywords into the search engine will yield the set of documents. The search results may produce many other documents and indeed the required documents may be split over many pages of results. The present invention further describes an algorithm that finds the ideal set of keywords such that the documents required appear close to the top of the search results.

A user launches a search engine to perform an Internet search. The user narrows down a query until the search engine returns the links the user is interested in. For example, a user has three web pages they are interested in. Then the user may enter the URLs of these web pages into a system and be given back a set of search keywords. The screen shot in FIG. 1 shows a convenient way to choose web pages based on selecting web pages in a browser using a check box 104 next to each link. Notice the check box 104 next to each search result. When the user has selected links from each result page, they click the "Find Matching Search" button 102 as shown in FIG. 1.

The search engine then generates keywords that best reflect the selected pages. This is achieved by performing a content analysis of the pages.

In another embodiment of the present invention, a shopping cart approach is utilized. For example, a user browses the Internet. Each time the user finds an interesting page, the user adds it to his/her cart. Once the user has collected enough documents, the user decides to check out. Then, the system returns a set of keywords that returns the selected pages in the search results by performing a content analysis of the selected pages.

The content analysis works as follows. A web page typically contains the actual content, some style sheet information (CSS), JavaScript and HTML markup. CSS, JavaScript, and HTML markup may be ignored. Actual contents of selected pages are utilized to extract keywords from the actual content of each selected page. Then, the keywords are combined so that the keywords common to all pages are identified (excluding common stop words such as "the", "and", "it"). The common keywords are then sorted according to a keyword frequency analysis (i.e., the number of times the keywords are used), to produce an overall ranking. It is understood that other keyword analysis algorithms can be used instead of the keyword frequency analysis. The search engine then runs a query using just one or few more of the top ranked keywords to see if the selected pages are returned at or near the top of the search results. If they are not, then the search engine repeats running a query with more of the top ranked keywords. As more of the keywords are introduced, the chance of returning the selected links increases (the size of the search query also increases, however).

As an embodiment, the present invention attempts to keep the number of search terms as small as possible. Fewer terms are generally considered to be more user-friendly. As another embodiment, the algorithm tries different combinations of the top ranked keywords to discover the best (and smallest) permutation that returns the links. For example, the top ranked keywords as extracted from the selected pages are "tennis", "federer", "2007", "ball", "competition", "sport", "grand" and "slam". Then using all these keywords in a search may yield the selected pages. However entering just "federer", "2007" and "slam" may also yield the selected pages sufficiently high in the search engine results. Therefore, this is a better permutation of words, since there are fewer of them. As staged above, fewer keywords are better so long as the required documents are still returned sufficiently high in the list of results.

After running content analysis of the selected pages, the best matching search keywords are returned, e.g., displayed to user, as shown at 202 at FIG. 2. The search engine results include the selected links but also more links that typically show good correlation with the selected pages and so are useful to the user. The user is then free to select more links from the results and repeat the above process.

Figure 3:
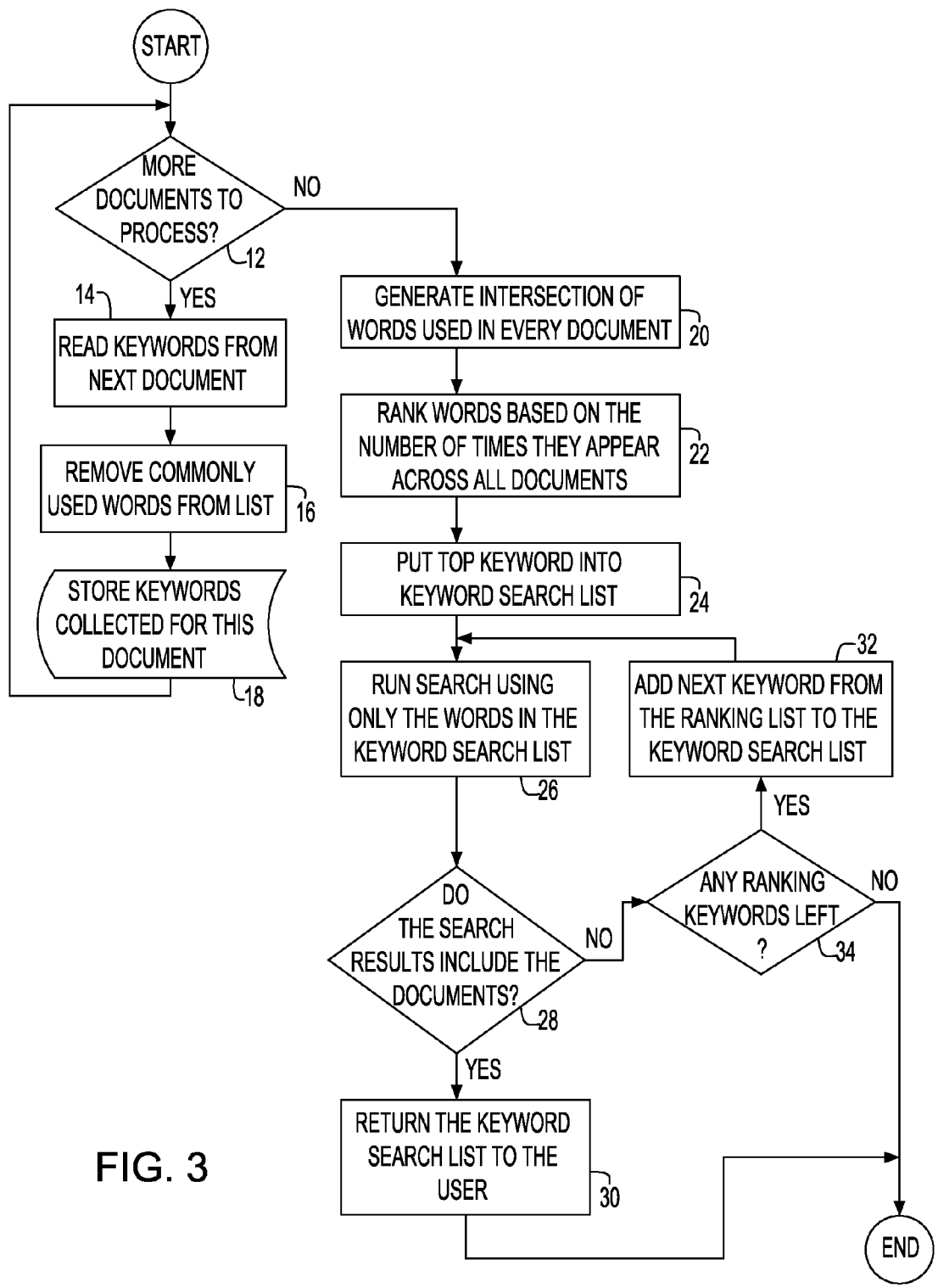
FIG. 3 depicts a flow chart illustrating a method of generating a best matching keyword in one embodiment of the present invention.

The above process is illustrated in FIG. 3. A user launches an Internet search engine and selects interesting documents, which are one or more web sites or URLs from search results in which the user is interested. At step 14, keywords are extracted from the documents. Step 16 removes common stop words such as "the", "and", and "it" and also removes common non-domain specific words such as "suddenly" and "attention" in the keywords. Step 16 removes words based on a grammatical analysis. So, for example, it could remove pronouns ("that", "he", "it", "we"), prepositions ("on", "beneath", "against") and conjunctions ("and", "when") but leave nouns, adjectives and adverbs since these are semantically important words that the algorithm should consider and rank. At step 18, the keywords are saved and processing goes back to Step 12. Step 12 checks if there are more documents to extract keywords. If all the keywords are extracted from all the documents that user selected, step 20 creates a list of words that appear in every document. Step 22 produces an overall ranking list for each keyword according to a keyword frequency analysis (i.e., how often a keyword appears in each document.) It is understood that other keyword analysis algorithms can be used instead of the keyword frequency analysis. Step 24 puts a top ranked keyword into keyword search list. Step 26 runs search by using words in the keyword search list. In one embodiment, step 26 starts with just a single keyword from the ranking list. Each round, step 32 takes a new word from the ranking list and adds it to the keyword search list. New word added at each additional round can be one new word at a time, multiple words at a time, or different number of words at a time, etc., for instance, depending on design or implementation choice. Step 28 verifies that the selected documents were indeed returned by the keywords entered, and that the selected documents are high enough in the search results.

Step 30 indicates a set of search terms that returns the documents at a sufficiently high position in search results has been found. It is up to the user to define how high the documents should appear, as shown at 106 at FIG. 1. For example, let's say "sport" and "federer" return the selected pages on page 22 and 23 of the search results. But, the user wants the selected pages on the first two pages of the results. To achieve this, Step 32 adds more keywords according to the overall ranking list (for example, "slam" and "grand") thereby making the search more specific to the selected pages. With these keywords "sport", "federer", "grand" and "slam", the selected pages appear on page 4 but as before this isn't high enough. So the algorithm repeats by adding more keywords from the ranking list.

In another embodiment of the present invention, the algorithm tries some different permutations of keywords. For example, let's say that "sport", "federer", "grand", "sport", "ball" and "slam" produce the documents on page 2. It may be that removing "ball" from the keywords does nothing detrimental to the results. So the algorithm is free to try different permutations of the keywords to see if it can remove some (as stated above, fewer keywords is better). Trying different permutations of the keywords may be performed as a last step, once a set of successful keywords (i.e., keywords that returns the documents at a sufficiently high position in search results) has been determined. How high the documents must go in the search results is defined by the user, as shown at 106 at FIG. 1. For example, if a user wants the documents on the top page and the keywords "Federer" and "Tennis" yield the documents on page 20 in search results, then that isn't high enough. So the algorithm would repeat and add an extra keyword from the ranking list, e.g., "Grand". Then, the documents may appear on page 10 of search results but still not be as high as the user requested. So, at next loop round, the algorithm adds "Slam" from the ranking list. Now the documents appear on page 1 in search results and the algorithm terminates. Typically, asking for the documents to be higher in the search results requires more ranking keywords to be used. If the documents are not found in the search results or not at a high position in the search results, step 34 checks if any ranked keywords are left in the ranking list. For example, let's assume that a single keyword "sport" did not pass step 28. Therefore the algorithm introduces a next keyword "federer" and repeats the process. If "sport" and "federer" do not work either, then it introduces another next keyword and so on. The algorithm terminates when all keywords have been used.

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method for generating a best matching search keyword that accurately returns one or more chosen links when entered in a search engine comprising:
    (a) selecting links in search results generated from a search engine;
    (b) obtaining a position which specifies how high the selected links shall appear on search results;
    (c) extracting keywords from contents of said selected links;
    (d) removing common stop words and common non-domain specific words in said keywords;
    (e) producing an overall keyword ranking by sorting common keywords according to a keyword analysis;
    (f) running a search engine by using one or more top ranked keywords in the overall keyword ranking;
    (g) checking if said selected links are returned within said obtained position in search results;
    h) if said selected links are not returned within said obtained position in the search results, running said search engine by using more of top ranked keywords in the overall keyword ranking;
    (i) repeating step (h) until said search engine returns said selected links within said obtained position in search results;
    (j) generating said best matching search keyword that returns the selected links within said obtained position in the search results; and
    (k) providing said selected links and other links that relate to said best matching search keyword.

2. The method according to claim 1, further comprising:
    (l) running said search engine by using different combination of the top ranked keywords to discover a smallest permutation that returns said selected links.

* * * * *